Figure 1:
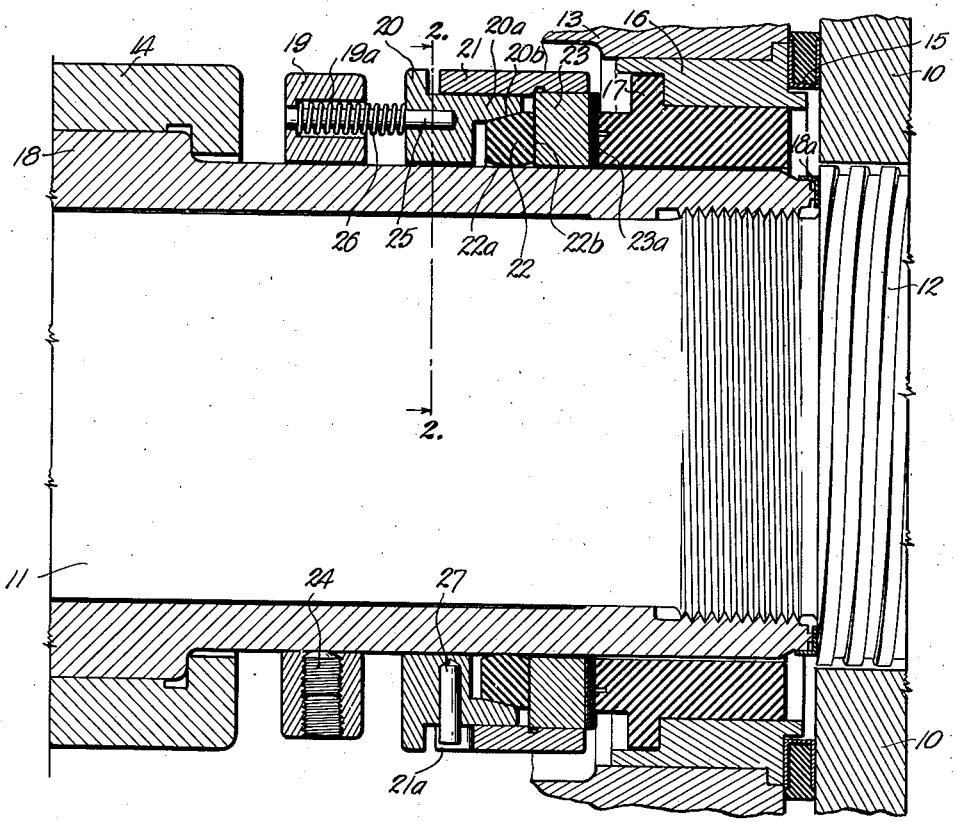

Nov. 7, 1944.                C. W. STRATFORD                2,362,436
                       FLUID SEAL FOR ROTATING SHAFTS
                          Filed Oct. 24, 1942

INVENTOR.
Charles W. Stratford
BY Thos. E. Scofield
ATTORNEY.

Patented Nov. 7, 1944

2,362,436

UNITED STATES PATENT OFFICE 2,362,436

FLUID SEAL FOR ROTATING SHAFTS

Charles W. Stratford, Kansas City, Mo., assignor to Stratford Development Corporation, Kansas City, Mo., a corporation of Delaware Application October 24, 1942, Serial No. 463,199

4 Claims. (Cl. 286—7)

This invention relates to improvements in fluid seals for rotating shafts and refers more particularly to a device for effectively sealing a rotating shaft by employment of a seal ring and a compression ring, the former having its sealing surface extending radially from the axis of the shaft, the latter or compression ring, having its sealing surfaces on its interior surface directly against the periphery of the shaft and on one of its lateral faces contacting the sealing ring.

The salient feature of the invention lies principally in the use of

1. Super-finished surfaces as the sealing surfaces,
2. The employment of materials in the sealing elements which may be given a super-finish or mirrorlike surface, and which are relatively unaffected by corrosive products,
3. A unique assembly rotating with the shaft, constructed to simultaneously impose a force radially of the compression ring and axially of the seal ring whereby effective seals are formed between the compression ring and the shaft, and the sealing ring and a stationary abutting surface within the seal housing.

Among the important objects of the invention are to provide a durable, effective seal for fluids either under pressure of vacuum, to provide a seal which is easily adjustable and automatically compensates for wear, shrinkage or compacting of the sealing elements, to provide a seal which is simple, economical and easily reparable, and one which is relatively unaffected by the inroads of corrosive chemicals. Further advantages of the seal will be obvious from the drawing and description.

Figure 2:
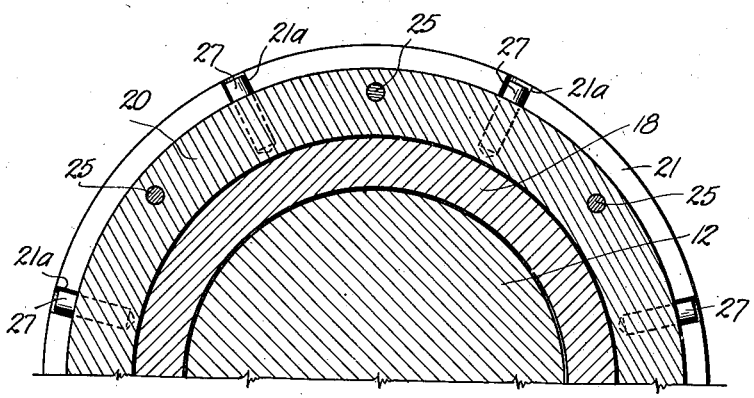

In the accompanying drawing which forms part of the specification and is to be read in conjunction therewith and in which like reference numerals are used to indicate like parts in the various views, Fig. 1 is a cross sectional view of the seal with parts broken away, and Fig. 2 is a view taken along the line 2—2 in Fig. 1.

The seal herein disclosed is adaptable for use wherever it is desired to effectively seal a rotating shaft, for example, in refrigeration apparatus, compressors, rotary pumps, chemical apparatus or systems where obnoxious or poisonous fluids are being pumped or used.

While, as previously indicated, the sealing device is adaptable for innumerable applications, the explanation here is with respect to a seal for a shaft operating a contactor device as disclosed in Patent No. 1,736,018, issued November 19, 1929, where olefinic and paraffinic hydrocarbon gases are alkylated in the presence of hydrogen fluoride, sulfuric acid, or other corrosive catalysts.

Heretofore, where sealing devices available in this art were used, seals have been effected between such materials as carbon and steel or steel and synthetic plastics or rubber.

In the present device, there have been selected for use such materials as a combination of pulverulent carbon and graphite of very fine grain, impregnated with corrosive-resistant reinforcing metal such as cadmium, silver and illium. The sealing surfaces of the elements are given a mirrorlike finish known to the art as a super-finish as is the steel and stellite surface against which the sealing surfaces contact. This avoids the likelihood of wear and produces a much more effective seal.

Referring to the drawing, at 10 is shown a portion of an impeller head which is the vessel containing the fluid to be sealed, the seal being located at the rotating surface of a shaft 11. The shaft extends into the vessel and is rotated by a prime mover such as a motor, not shown. An impeller is mounted within the vessel to agitate and mix the fluids and catalyst which are being alkylated. The impeller and details of the mixing device or contactor have been omitted from the drawing in the interests of simplicity.

The invention lying primarily in the seal, only that portion of the shaft where the seal is located is shown. The shaft is indicated by numeral 11 and where it enters the impeller head 10 there is machined on the shaft a back feed screw 12 which, with the rotation of the shaft, tends to move the materials within the impeller head 10 in a direction away from the seal. The seal housing 13 enclosing the entire seal mechanism and bearing sleeve 14 are affixed to the impeller head by a sealing ring or gasket 15 which assures a fluid-tight connection between the seal housing and the impeller head or housing. Within the seal housing and abutting the gasket 15 is an insert mounting ring 16 which holds the insert 17 rigidly in place. The gasket 15, the insert mounting ring 16, and insert 17 are all stationary with the seal housing. The insert 17 is a ring preferably formed of hydraulically molded pulverulent carbon with a matrix of reinforcing metal such as silver, illium or other corrosion-resisting metal. On a shaft 11 is screw-threaded a sleeve 18 which is carried by and rotates within bearing sleeve 14. The end of the sleeve adjacent the back feed screw 12 has interposed between the screw and the sleeve a gasket 18a which assures a fluid-tight fit between the sleeve and screw, preventing the entrance of corrosive materials into the threads of the screw.

Rotatable with the shaft and forming a rotating assembly are a drive ring 19, a gland 20, a sealing ring collar 21, compression ring 22 and a seal ring 23. The drive ring is fixedly attached to the rotating sleeve 18 by means of set screws 24 located at intervals around the ring. Between the set screws 24 are axial holes 19a. Within these holes are mounted compression spring assemblies consisting of guide pins 25 and compression springs 26. The guide pins enter holes in the gland 20 in alignment with the holes 19a in the drive ring, thus causing the gland to rotate with the drive ring. The seal ring 23 is pressed into the seal ring collar 21 forming a unitary structure therewith. At intervals along the edge of the seal ring collar which overlaps a portion of the gland are indentations or slots 21a. Through these slots extending into the gland are pressed, screwed, or otherwise fastened drive pins 27. These drive pins, rotating with the gland, drive with the gland the seal ring collar and seal ring 23.

On the opposite side of the gland from that into which the pins 25 enter is an extension or overhanging portion 20a which has a lower beveled surface 20b. Between the gland 21 and seal ring 23 located beneath the extension 20a of the gland is the seal ring 22. The outer circumferential surface of the seal ring 22 is beveled to correspond and fit the inner beveled surface 20b of the gland. The interior surface of the compression ring 22 has a super-finish or mirrorlike surface at 22a where it contacts the outer surface of the shaft sleeve 18. The edge or face 22b of the compression ring which contacts seal ring 23 is given a super-finish as is the contacting face of the seal ring, thereby producing a sealing, not only at 22a between the shaft sleeve and compression ring but also at 22b between the compression ring and seal ring. The seal ring 23 is of steel and is surfaced at 23a on the face opposite that which contacts the compression ring with a hard material such as stellite. This stellite surface is also given a mirrorlike super-finish as is the contacting face of insert 17.

From the description, it will be seen that the rotating assembly comprising the drive ring 19, gland 20, seal ring collar 21, seal ring 23 and compression ring 22 rotate as a unit with the sleeve 18 due to the engagement of the guide pins 25 with the gland, and drive pins 27 with the seal ring collar.

Compression springs 26 impose continual axis pressure or force against the gland 20 and, due to the beveled surface 20b of the gland, there is transmitted an axial force to both the compression ring 22 and seal ring 23 and a radial force against the outer periphery of the compression ring. These axial and radial forces press the seal surface 23a of the seal ring against the super-finish surface of the insert and the inside sealing surface of the compression ring against the outer periphery of the shaft sleeve. Thus there is effectively formed a seal along the periphery of the shaft sleeve at 22a and a radial seal between the seal ring 23 and insert 17 at 23a.

To assure resistance to corrosive fluids and prevent failure of the seal from wear, I prefer to make the insert 17 and compression ring 22 of a unique combination of materials according to a technique developed by the Morganite Brush Company of Long Island City, New York.

To finely ground pulverulent carbon and graphite of requisite purity to insure against the possible presence of contaminating materials is added a small amount of binder such as coal tar. This mixture is then formed under high pressure and the molded article heated between two electrodes with a high amperage current at temperatures between 1500° C. to 3000° C. to vaporize off the binder producing voids in the article.

Molten cadmium, silver, illium, alloys thereof or metals having corrosion-resisting properties may then be impregnated into the interstices or voids of the article evacuated by the evaporation of the binder, the metal forming a skeleton reinforcement for the carbon and graphite.

Throughout the specification and claims, the term "super-finished" has been used. Where flat contacting surfaces are finished to produce a sealing surface, they are super-finished within a few micro inches of true optical flatness. Where curved surfaces are super-finished as is the shaft sleeve 18 and inner surface of the compression ring 22, the dimensions of the asperites, hills and valleys, do not exceed five micro inches.

Circulated within the seal housing 13 and around the rotating and stationary parts of the seal is a fluid lubricant. The pressure on this circulating lubricant is maintained somewhat in excess of pressures existing within the impeller head 10 to assist the seal in preventing leakage of fluid.

It is recognized that the use of a back feed screw such as that shown at 12 and the employment of a circulating fluid under pressure in excess of the pressures existing within the vessel to be sealed are devices known to the art to prevent loss of pressure and fluid around a rotating shaft.

In operation, the back feed screw, the seals effected at the surfaces 23a and 22a, combined with the effect of the lubricant circulated under pressure within the seal housing, very effectively seals the rotating shaft against the possibility of the escape of fluid from the impeller head.

Furthermore, it is recognized practice to employ a seal ring and resilient compression ring interposed between a radial seal surface and a spring actuated gland. All seals of this type, however, while relying upon a radial sealing surface, have used a resilient material as a compression ring to produce a seal between the compression ring and shaft or rotating surface.

As previously suggested, it is thought to be new to bevel the surface of the gland in such fashion that there is simultaneously imposed upon the compression ring and sealing ring an axial force to effect the radial seal between the rotating and stationary parts, and a radial force upon the compression ring to produce the seal axially of the shaft between the inner surface of the compression ring and the rotating shaft surface.

From the foregoing, it will be seen that my invention is one well adapted to attain all of the ends and objects hereinbefore set forth, together with other advantages which are obvious and which are inherent to the structure of the device.

Having thus described my invention, I claim:

1. In combination with a fluid seal for a rotating shaft, of a seal housing, a rotatable shaft passing through said seal housing, an insert fixedly mounted in the seal housing and surrounding the shaft, said insert having an end face surfaced as a sealing face, an assembly rotating with the shaft including a seal ring abutting the insert and having sealing engagement therewith, a rigid compression ring and a gland, said compression ring positioned intermediate the seal ring and gland and having sealing faces abutting the seal ring and shaft said abutting and sealing faces of the seal ring, compression ring and shaft reduced to a mirror-like finish, means for imposing axial force against the gland whereby said force is transmitted through the gland, compression ring, seal ring assembly and effective seals created between the contracting surfaces of the insert and seal ring and the compression ring, seal ring and shaft.

2. In combination with a fluid seal for a rotating shaft, of a seal housing, a rotatable shaft passing through said housing, an insert fixedly mounted in the seal housing and surrounding the shaft, said insert having an end face surfaced as a sealing face, an assembly rotating with the shaft including a seal ring abutting the insert and having sealing engagement therewith, a compression ring and a gland, said compression ring intermediate the seal ring and gland and having sealing surfaces at the abutting faces with the seal ring and shaft, said seal and compression rings formed of metal impregnated carbonaceous material having a texture adapted to receive a mirror-like finish at their sealing surfaces, and means for imposing axial force against the gland.

3. In combination with a fluid seal for a rotating shaft, of a seal housing, a rotatable shaft passing through said seal housing, an insert surrounding the shaft and fixedly mounted in the seal housing, said insert having an end face surfaced as a sealing face, an assembly rotating with the shaft including a seal ring, a compression ring and an axially movable gland, said compression ring formed of a relatively rigid carbonaceous material and positioned intermediate the gland and seal ring, both the compression ring and seal ring positioned between the gland and insert, beveled abutting faces on the compression ring and gland, means for moving the gland axially, said means coacting with said beveled abutting faces of the compression ring and gland to simultaneously impose a radial force upon the compression ring and an axial force on the sealing ring whereby an effective seal is created between the compression ring and shaft, and the sealing ring and insert.

4. In combination with a fluid seal for a rotating shaft, of a seal housing, a rotatable shaft passing through said seal housing, an insert fixedly mounted in the seal housing and surrounding the shaft, said insert having an end face surfaced as a sealing face, an assembly rotating with the shaft including a seal ring abutting the insert and having sealing engagement therewith, a compression ring and an axially movable gland, said compression ring and insert formed of metal impregnated carbonaceous material having a texture adapted to receive a mirror-like finish on their sealing surfaces, said compression ring positioned intermediate the gland and seal ring, and both the compression ring and seal ring positioned between the gland and insert, beveled abutting faces on the compression ring and gland, abutting surfaces on the stationary insert and seal ring, and means for imposing axial movement to the gland whereby axial pressure is transmitted to the seal between the seal ring and insert and radial pressure to the seal between the compression ring and shaft.

CHARLES W. STRATFORD.